(12) United States Patent
Majumdar et al.

(10) Patent No.: US 9,628,366 B2
(45) Date of Patent: Apr. 18, 2017

(54) METHODS, SYSTEMS, AND COMPUTER READABLE MEDIA FOR SUSTAINING ACTIVE CONTROL OVER CONCURRENT SESSION CONNECTIONS

(71) Applicant: Ixia, Calabasas, CA (US)

(72) Inventors: Partha Majumdar, Woodland Hills, CA (US); Pratik Ganguly, Kolkata (IN); Sirshendu Rakshit, Kolkata (IN); Sudipta Das, Kolkata (IN)

(73) Assignee: IXIA, Calabasas, CA (US)

( * ) Notice: Subject to any disclaimer, the term of this patent is extended or adjusted under 35 U.S.C. 154(b) by 157 days.

(21) Appl. No.: 14/254,878

(22) Filed: Apr. 16, 2014

(65) Prior Publication Data

US 2015/0304202 A1  Oct. 22, 2015

(51) Int. Cl.
*H04L 12/26* (2006.01)
*H04L 29/08* (2006.01)
*H04L 29/06* (2006.01)

(52) U.S. Cl.
CPC .............. *H04L 43/50* (2013.01); *H04L 67/14* (2013.01); *H04L 67/142* (2013.01); *H04L 67/146* (2013.01); *H04L 69/16* (2013.01); *H04L 67/26* (2013.01)

(58) Field of Classification Search
CPC ... H04L 43/50; H04L 67/142; H04L 12/2697; H04L 69/16; H04L 69/161
USPC .................. 370/252, 241, 392, 469; 709/224
See application file for complete search history.

(56) References Cited

U.S. PATENT DOCUMENTS

| 6,519,461 | B1* | 2/2003 | Andersson | H04W 28/18 455/450 |
|---|---|---|---|---|
| 2004/0066746 | A1* | 4/2004 | Matsunaga | H04L 47/10 370/235 |
| 2006/0239198 | A1* | 10/2006 | Mlinarsky | H04W 24/06 370/241 |
| 2008/0225721 | A1* | 9/2008 | Plamondon | H04L 47/10 370/235 |

OTHER PUBLICATIONS

"IxLoad" Ixia, Solution Brief, pp. 1-4 (Feb. 2012).
Comer, Douglas E., *Internetworking with TCP/IP*, vol. 1: Principles, Protocols, and Architecture, Third Edition, pp. 201-203 (2005).

* cited by examiner

*Primary Examiner* — Jamal Javaid
(74) *Attorney, Agent, or Firm* — Jenkins, Wilson, Taylor & Hunt, P.A.

(57) ABSTRACT

Methods, systems, and computer readable media for sustaining active control over concurrent session connections are disclosed. According to one example, the disclosed subject matter describes herein a method that includes opening a plurality of session connections to a device under test (DUT), wherein each of the opened session connections is associated with an initial window size value and receiving data from the DUT via one or more of the opened session connections. The method further includes communicating a packet instructing the DUT to cease sending the data via the one or more of the opened session connections in the event the data received from the DUT equals the initial session window size value and utilizing at least one of the opened session connections not being used to receive the data from the DUT in order to resume active communication of the data with the DUT.

20 Claims, 4 Drawing Sheets

METHODS, SYSTEMS, AND COMPUTER READABLE MEDIA FOR SUSTAINING ACTIVE CONTROL OVER CONCURRENT SESSION CONNECTIONS

TECHNICAL FIELD

The subject matter described herein relates to testing devices. More particularly, the subject matter described herein relates to methods, systems, and computer readable media for sustaining active control over concurrent session connections.

BACKGROUND

One important measurement associated with performance testing of Layer 4-7 devices relates to the determination of the number of concurrent transmission control protocol (TCP) connections a device under test (DUT) can simultaneously keep active. Specifically, the ability to merely maintain a large number of connections in an open state may not be sufficient for some test purposes. Rather, it is important to ensure that each tested connection is actively communicating packet traffic on a relatively frequent basis. Notably, if an open TCP connection does not transport any traffic for an extended period (i.e., even if the connection is not expressly closed), a network device (or a DUT) may interpret the non-active TCP connection as being down and subsequently close the connection in order to free up the associated memory resources for other requirements.

Although a test system may be readily configured to open the largest number of possible connections and allow a tested device to freely conduct packet transactions without any control, employing such an approach is not without problems. Specifically, if the connections are configured to conduct the transactions independently, then the connections may be closed independently as well. Consequently, the total number of opened connections may fall to significantly low numbers during a testing period. Likewise, an opened TCP connection that does not exchange traffic consumes less memory than a TCP connection that is actively communicating packet traffic. Thus, if all the connections are allowed to exchange traffic without any control, the total memory consumption of the emulation system can rapidly approach and reach its maximum level.

Accordingly, there exists a need for methods, systems, and computer readable media for sustaining active control over concurrent session connections.

SUMMARY

Methods, systems, and computer readable media for sustaining active control over concurrent session connections are disclosed. According to one aspect, the subject matter described herein includes a method that includes opening a plurality of session connections to a device under test (DUT), wherein each of the opened session connections is associated with an initial window size value and receiving data from the DUT via one or more of the opened session connections. The method further includes communicating a packet instructing the DUT to cease sending the data via the one or more of the opened session connections in the event the data received from the DUT equals the initial window size value and utilizing at least one of the opened session connections not being used to receive the data from the DUT in order to resume active communication of the data with the DUT.

The subject matter described herein may be implemented in hardware, software, firmware, or any combination thereof. As such, the term "module" as used herein can refer to hardware, which may also include software and/or firmware components, for implementing the feature being described. In one exemplary implementation, the subject matter described herein may be implemented using a non-transitory computer readable medium having stored thereon computer executable instructions that when executed by the processor of a computer control the computer to perform steps. Exemplary computer readable media suitable for implementing the subject matter described herein include non-transitory computer-readable media, such as disk memory devices, chip memory devices, programmable logic devices, and application specific integrated circuits. In addition, a computer readable medium that implements the subject matter described herein may be located on a single device or computing platform or may be distributed across multiple devices or computing platforms.

BRIEF DESCRIPTION OF THE DRAWINGS

The subject matter described herein will now be explained with reference to the accompanying drawings of which.

DETAILED DESCRIPTION

The subject matter described herein relates to methods, systems, and computer readable media for sustaining active control over concurrent connections. Reference will now be made in detail to exemplary embodiments of the presently disclosed subject matter, examples of which are illustrated in the accompanying drawings. Wherever possible, the same reference numbers will be used throughout the drawings to refer to the same or like parts. Various embodiments of the present subject matter are disclosed and described herein.

Figure 1:
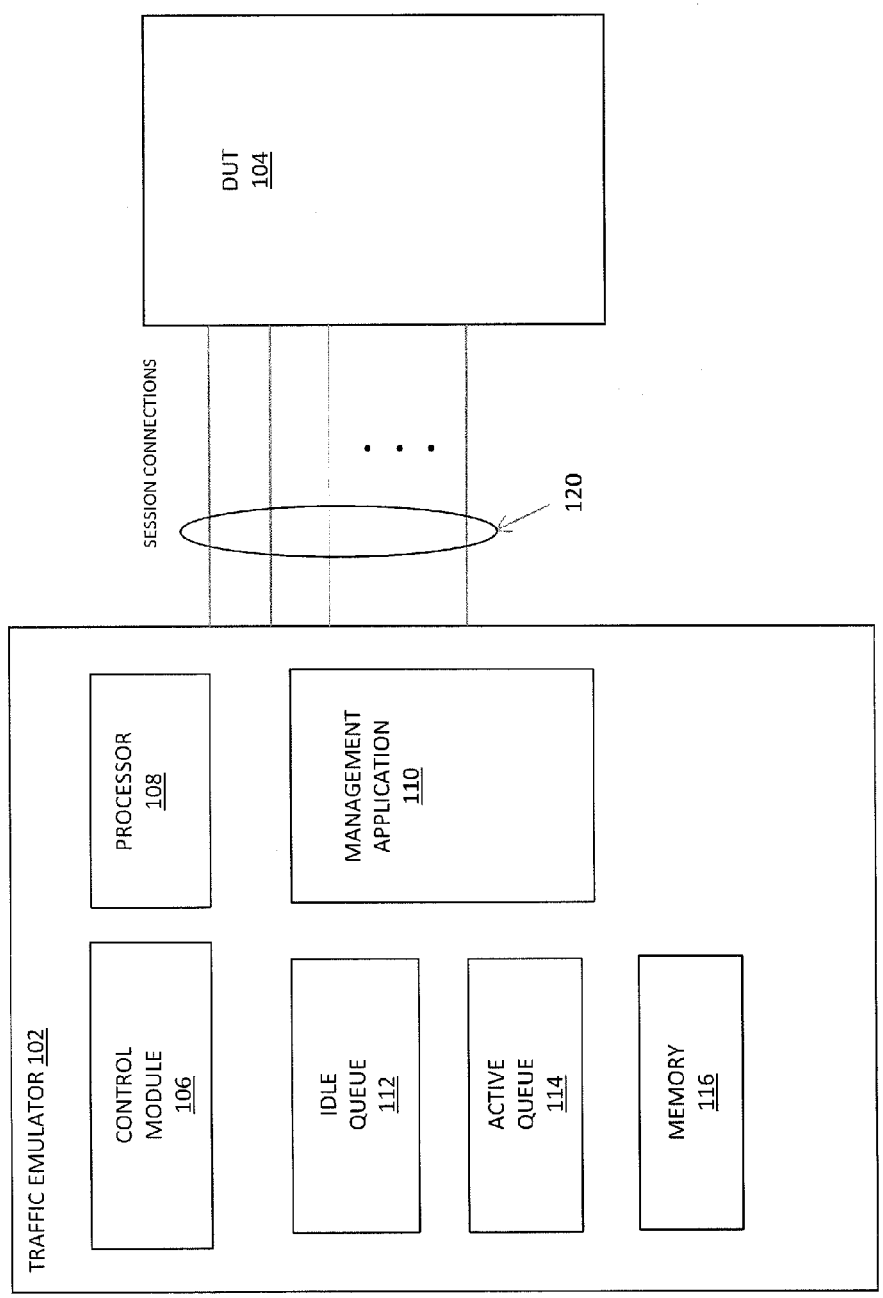
FIG. 1 is a block diagram illustrating an exemplary wireless communications network that includes access points under test according to an embodiment of the subject matter described herein.

FIG. 1 is a block diagram illustrating an exemplary architecture for a test simulation system 100 according to an embodiment of the subject matter described herein. Referring to FIG. 1, system 100 includes a traffic emulator 102 (e.g., a traffic emulation device) that is communicatively connected to a device under test (DUT) 104. In some embodiments, DUT 104 may include a serving gateway (SGW) element, a packet data network gateway (PGW) element, a firewall element, a server load balancer element, a deep packet inspection (DPI) device, or any device or system that may benefit from high throughput traffic simulation testing. In one embodiment, DUT 104 may be communicatively connected to traffic emulator 102 via a wired or wireless connection that facilitates the transfer of encrypted or unencrypted packet traffic. For example, FIG. 1 depicts traffic emulator 102 connected to DUT 104 via session connections 120. Although the utilization and management of transmission control protocol (TCP) connections is described below, any type of session connection may be used without departing from the scope of the disclosed subject matter.

In some embodiments, traffic emulator 102 may include a hardware based device or equipment that is configured to generate and send emulated packet traffic to DUT 104 for load testing purposes. In one embodiment, traffic emulator 102 may include a control module 106, a processor 108, a management application 110 (e.g., a layer 7 application), an idle queue 112, an active queue 114, and memory 116. Processor 108 may include a central processing unit (CPU), a microcontroller, or any other hardware based processing unit that configured to manage and execute elements 106, 110, 112, and 114 in traffic emulator 102. Processor 108 may also be configured to access memory 116 and various specialized units, circuits, software, and interfaces for providing the functionality and features described herein. In some embodiments, traffic emulator 102 may function as either a client entity or a server entity. In some embodiments, memory 116 can include random access memory (RAM), read only memory (ROM), optical read/write memory, cache memory, magnetic read/write memory, flash memory, or any other non-transitory computer readable medium. In some embodiments, processor 108 and memory 116 be used to execute and manage the operation of control module 106 and/or management application 110.

In some embodiments, control module 106 may include a control mechanism (e.g., using a TCP stack) that may be implemented to control the session connections (e.g., "sessions") utilized by traffic emulator 102. For example, control module 106 may be configured to open and close existing session connections between traffic emulator 102 and DUT 104. In some embodiments, control module 106 may include control logic that manipulates the window size of communicated packets (or frames). Notably, the control logic can be easily verified or detected by changing the configured window size in communicated packets and subsequently analyzing the packet captures of individual session connections.

Control module 106 may also be configured to transfer session connections (e.g., identifiers associated with the session connections) between idle queue 112 and active queue 114. In some embodiments, idle queue 112 includes a storage queue that includes session connections (and/or session connections identifiers) that are opened but are not actively facilitating the transmission and/or reception of traffic data (e.g., packet and/or frame data). Likewise, active queue 112 includes a storage queue that includes opened session connections (e.g., session identifiers) that are actively conducting the transmission and/or reception of packet data.

In some embodiments, the disclosed subject matter utilizes a window adjustment feature associated with TCP to sustain control over active concurrent session connections. For example, control module 106 may be configured to advertise, for each session connection, an initial window size value with every packet (e.g., a DATA/ACK packet or a push packet) that is communicated the session sends out. For example, control module 106 may establish a TCP connection with an initial window size value equal to "IW" (e.g., IW=2000 bytes). In some embodiments, the initial window size value may be configurable by a system operator through a user interface. Upon receiving some amount of data, a TCP stack of a typical TCP connection may reduce the window size in accordance to the amount of data received if the data is not immediately processed by the receiving device. More specifically, a TCP connection only transfers data and has no control as to when received data is actually processed by application layer (e.g., layer 7). If the device is unable to process an amount of received data that equals the initial window size for a TCP connection, the TCP stack of the device may can advertise a "zero window" size (e.g., 0 bytes) in a packet that serves as an indication/instruction to a sending device to cease the transmission of packets.

In contrast, the disclosed subject matter utilizes the window size mechanism of a session connection protocol, such as TCP, to provide flow control on a per session basis. For example, rather than the TCP stack advertising a new window size whenever management application 110 reads data (and the TCP stack responds by clearing associated data buffers storing the read data), direct control with respect to the decision to publish a new window size may be provided to management application 110 (as opposed to the TCP stack and/or control module 106).

Notably, the present subject matter discloses a control module 106 that opens a plurality of session connections 120 (e.g., TCP connections) that are communicatively connected to DUT 104 and assigns each session starts with an initial window size value equal to IW (e.g., 1000 bytes). Management application 110 may be configured to read data received from DUT 104 from a socket and reduce the window size accordingly. However, as management application 110 reads the data, control module 106 may be configured to not increase the new window per normal TCP operations, but rather gradually reduce the window size. Once an amount of data equal to the initial window size value is received from DUT 104 by traffic emulator 102, management application 110 may advertise a zero window size in a packet communicated to DUT 104. Management application 110 and/or control module 106 may then classify/designate the opened session connection as 'idle'. For example, control module 106 may remove the session connection (and/or an identifier associated with the session connection) from active queue 114 and record the session identifier in idle queue 112 (e.g., place session connection at the end of the list). Afterwards (or concurrently), a new and unused 'idle' session is selected from idle queue 112 and placed in active queue 114, thereby being classified as 'active'. For example, control module 106 may transfer a new session identifier (e.g., the first session connection identifier at the top of the list) from idle queue 112 to active queue 114. At this time, control module 106 may advertise a new window size to initiate a data exchange via the new session connection. Notably, this process may continue until all of the session connections have received a designated amount of data. Afterwards, the testing process may start anew, if necessary.

In one embodiment of the disclosed subject matter, control module 106 may be configured to open a designated number of connection sessions (e.g., all possible connection sessions that can be supported by traffic emulator 102) between traffic emulator 102 and DUT 104. At this stage, however, control module 106 does not yet initiate the communication of any data traffic (e.g., application layer 7 traffic) on the session connections. As indicated above, traffic emulator 102 may be configured to maintain idle queue 112 and active queue 114 in order to manage and alternate between the opened session connections. Notably, at any particular point of time, an opened session connection (and/or a session identifier associated with a session connection) is listed in either idle queue 112 or active queue 114. Session connections that are not actively communicating (i.e., transmitting and/or receiving) data at a given point of time reside in idle queue 112 while sessions actively transmitting and/or receiving data are listed in active queue 114.

In some embodiments, control module 106 establishes and/or opens a plurality of session connections to DUT 104. Afterward establishing the session connections, management application 110 places all of the opened session connections in idle queue 112 and advertises an initial window size value equal to "IW" within packets ultimately communicated to DUT 104 (e.g., a device under test). Prior to sending any data traffic to DUT 104, however, management application 110 may transfer a designated number "A" of opened session connections from idle queue 112 to active queue 114. In one embodiment, the opened session connections may be transferred from idle queue 112 to active queue 114 on an individual basis in turn. Alternatively, the transfer process may be conducted via groups of opened session connections. In some embodiments, the designation of the initial number of opened session connections (i.e., "A" session connections) to be used in a test session may depend on factors such as, but not limited to, the extra memory consumed by active session connections, the total amount of memory available on traffic emulator 102, and the maximum number of concurrent sessions connections to be supported. In one embodiment, a representative formula may include:

$$(A*AM)+((TC-A)*<=TM$$

where "AM" represents the maximum memory consumed by an active session connection, "IM" represents the maximum memory consumed by an idle session connection, and "TC" represents a maximum number of concurrent session connections to be supported by a system with a total amount of available memory equal to "TM".

In some embodiments, if the traffic test requires the first packet to be sent by DUT 104, then the traffic emulator 102 may be configured to advertise the initial window size value in an ACK packet without sending any data to DUT 104. In such a scenario, traffic emulator 102 may be configured to wait for a response from DUT 104.

Because the initial window size value is advertised as "IW" (e.g., in an ACK packet), DUT 104 will respond with TCP packets that include data amounting to IW bytes or less. For example, if traffic emulator 102 receives "X" bytes from DUT 104, traffic emulator 102 may subsequently send an ACK message to DUT 104 with a new window size equal to $(W_t-X)$ bytes, where $W_t$ denotes the window size at time "t" and $W_0$ is equal to IW bytes. This process continues for each session connection included in active queue 114 until traffic emulator 102 receives the designated/allocated IW bytes of data from DUT 104 for that session. Once traffic emulator 102 receives IW bytes of data for a session connection, traffic emulator 102 may be configured to advertise a zero window size and subsequently transfer that session from active queue 114 to idle queue 112. In one embodiment, management application 110 may be configured to keep track of the amount of data received on each session connection in order to determine when to send a packet advertising a zero window size to DUT 104.

In some embodiments, when the number of session connections included in active queue 114 falls below a predefined threshold "T", management application 110 on traffic emulator 102 may begin selecting and transferring open session connections from idle queue 112 to active queue 114 until the total number of session connections in active queue 114 reaches value "A". In the event a new open session connection is placed into active queue 114 from idle queue 112, control module 106 in traffic emulator 102 may again advertise the initial window size value as being IW for that session connection to DUT 104. Notably, traffic emulator 102 may continue sequentially processing sessions/connections in this manner until the complete/entire response for the layer 7 (L7) request (e.g., initially made by traffic emulator 102) is received by traffic emulator 102 from DUT 104. Accordingly, test emulator 102 effectively ensures that each opened session connection receives an equal opportunity to communicate traffic, and thus, does not remain idle for an extended period of time (i.e., time in which the session connection may be closed by DUT 104). In some embodiments, the threshold value of T may be designated to be equal to the value of A. In an alternative embodiment, the value of T may be designated to be less than A.

Figure 2:
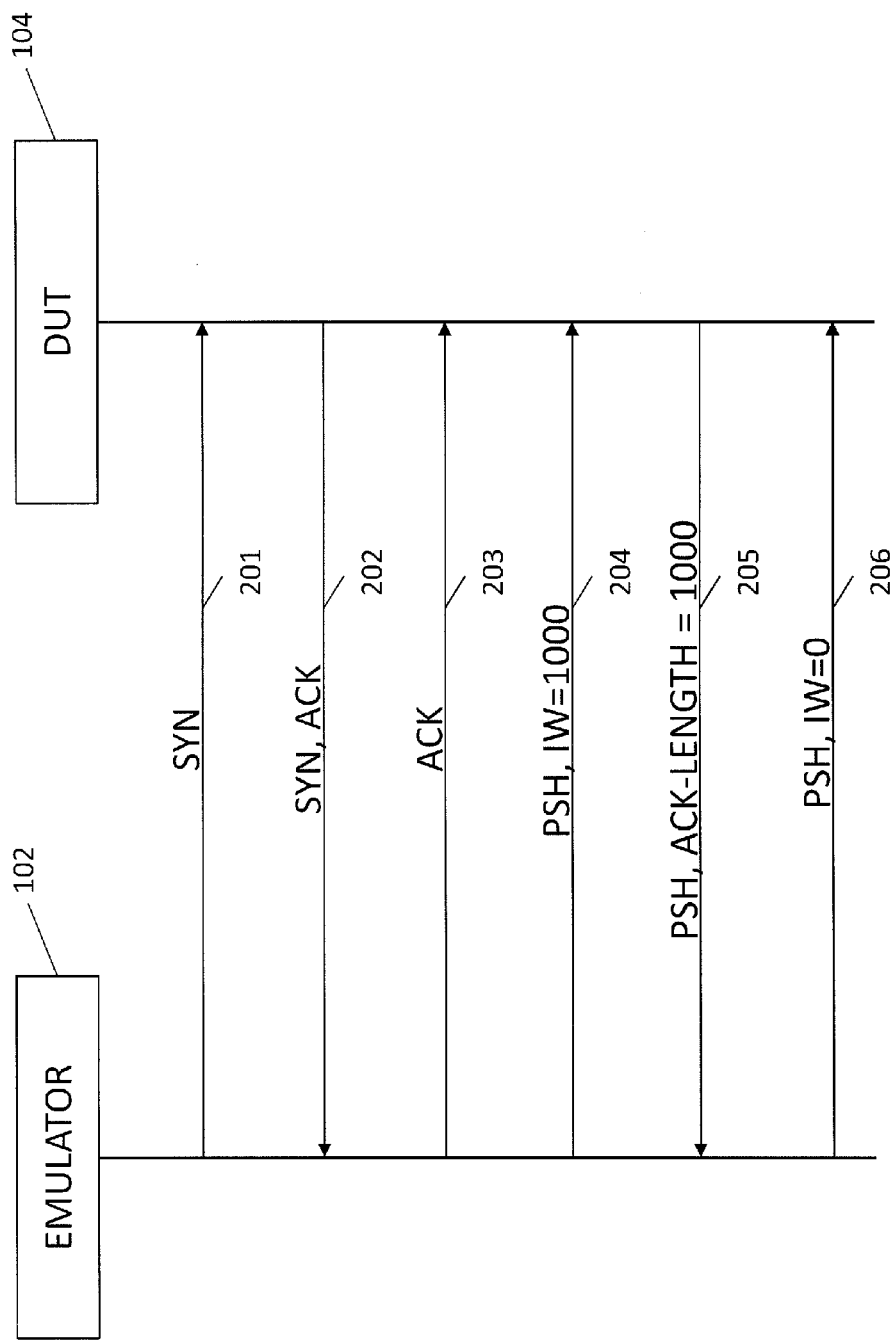
FIG. 2 is a diagram of an exemplary signaling sequence illustrating the use of a packet window size to sustain active control over concurrent TCP connections according to an embodiment of the subject matter described herein.

FIG. 2 is a diagram illustrating an exemplary signaling sequence illustrating the use of a TCP packet's window size field to sustain active control over concurrent connections. In FIG. 2, traffic emulator 102 initiates a handshaking procedure by directing a synchronize (SYN) message 201 to initiate a connection with DUT 104. In response to receiving SYN packet 201, DUT 104 responds to traffic emulator 102 with a SYN/ACK packet 202 which functions as an acknowledgment to SYN packet 201 as well as its own SYN message. To complete the handshaking procedure, traffic emulator 102 sends an ACK packet 203 to DUT 104 to acknowledge receipt of the SYN portion of packet 202.

Upon completing the handshaking procedure, the TCP session between traffic emulator 102 and DUT 104 is established. Although FIG. 2 depicts a single TCP connection between traffic emulator 102 and DUT 104, additional active TCP connections traffic emulator 102 and DUT 104 can be established in this manner without departing from the scope of the disclosed subject matter.

Once an active TCP connection is established, traffic emulator 102 may send packet 204 to DUT 104. In FIG. 2, packet 204 from traffic emulator 102 includes a push (PSH) packet that may comprise an HTTP GET command that serves as both a request for data from DUT 104 and as an advertisement/notification of an acceptable initial window (IW) size of 1000 bytes in the TCP packet header. In some embodiments where the first packet is supposed to be send by DUT 104, traffic emulator 102 may instead advertise the initial window size in an ACK packet without sending any data (or request for data) and wait for a response from DUT 104.

Upon receiving packet 204, DUT 104 can respond with packet 205. Notably, packet 205 is a PSH/ACK packet that is sent by DUT 104 to acknowledge the data sent in packet 304 by traffic emulator 102. Push packet 205 is also used to provide the data requested by HTTP GET packet 204, which is represented by the payload length of 1000 bytes. Although FIG. 2 illustrates a single PSH message 205, DUT 104 may provide the requested data in multiple push messages without departing from the scope of the disclosed subject matter.

Upon receiving data (e.g., packet 205) from DUT 104, traffic emulator 102 determines if the received amount of data is equal or exceeds IW (i.e., the advertised window size). If such an amount of data is received (as shown in FIG. 2), traffic emulator 102 is triggered and/or configured to send a new push message 206 that advertises a window size of zero (0). In response to receiving packet 206, DUT 104 may respond by ceasing to send any further data traffic over the active connection until further notice (e.g., a new push message advertising a new window size) from traffic emulator 102. Notably, despite not actively transferring data, the connection existing between traffic emulator 102 and DUT 104 remains open. At this point, traffic emulator 102 may utilize another open connection to resume sending data to DUT 104 before returning to the connection depicted in FIG. 2.

Figure 3:
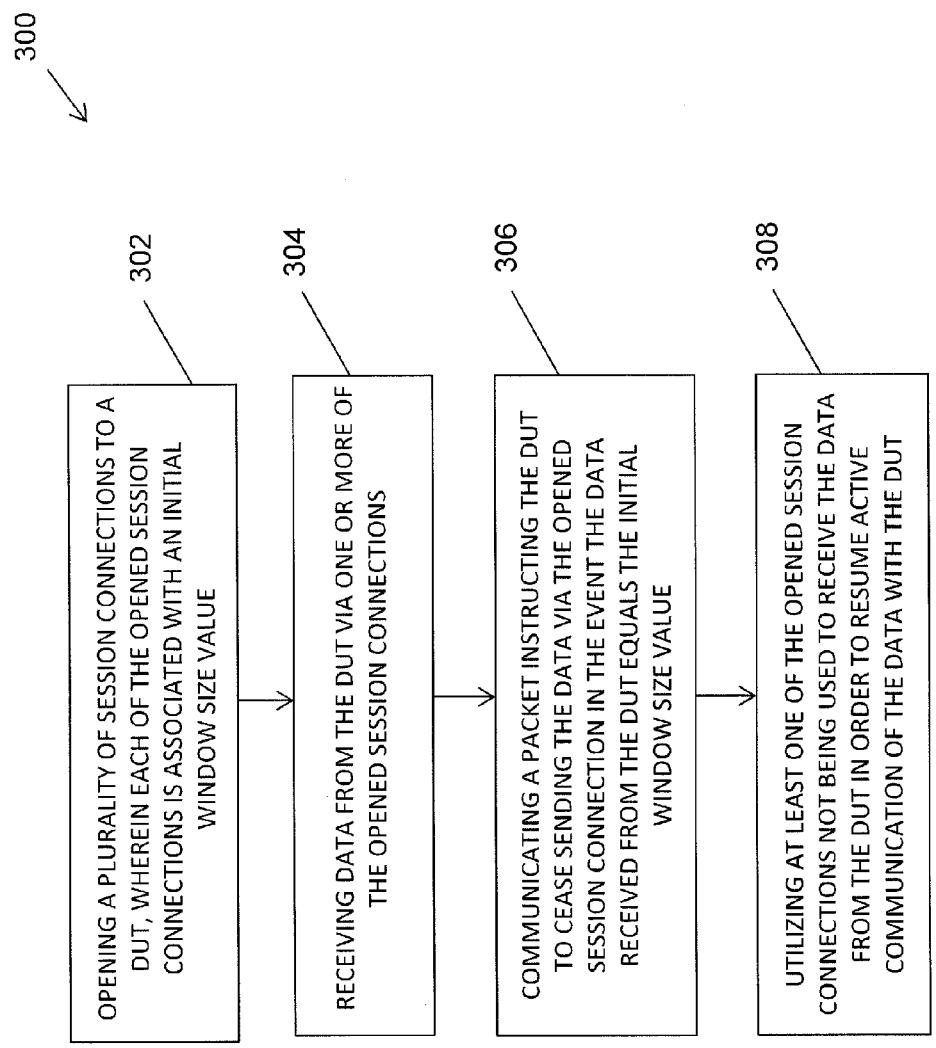
FIG. 3 is a flow chart illustrating an exemplary process for sustaining active control over concurrent session connections according to an embodiment of the subject matter described herein.

FIG. 3 illustrates a method 300 for utilizing concurrent connection control. In step 302, a plurality of session connections is opened. In some embodiments, a number of session connections existing between a traffic emulator and a DUT are opened. However, in some scenarios, packet traffic may not necessarily exist on one or more of the opened session connections. In addition, each of the opened session connections may be associated with an initial window size value that is ultimately advertised to a DUT via one or more communicated packets. In some embodiments, all opened session connections are initially placed in an idle queue located in the traffic emulator. For example, a control module in the traffic emulator may organize and manage the session connections by initially placing identifiers associated with each session connection in an idle queue.

In step 304, data is received from the DUT via one or more of the opened session connections. In some embodiments, the traffic emulator selects and transfers a number of session connections from the idle queue to an active queue. In some embodiments, the control module transfers identifiers associated with one or more opened session connections (e.g., 10,000 connections). Notably, opened session connections included in the active queue are used to actively transmit data to and receive data from the DUT.

In step 306, a packet instructing the DUT to cease sending data via the opened session connection is communicated to the DUT. In one embodiment, a layer 7 management application in the traffic emulator determines that the amount of data received from the DUT over a particular session connection equals the previously advertised initial window size value (e.g., as indicated in the TCP window field of the communicated packets). Such a determination triggers the management application to send a packet advertising a zero window to the DUT, which responds by ceasing all traffic communication on that particular session connection.

In some embodiments, the "consumed" session connection may be transferred from the active queue to the idle queue. For example, in the event the traffic emulator transmits a packet that indicates a zero window size, then control module may transfer the associated session connection (and/or session connection identifier) from the active queue to the idle queue. In response, the traffic emulator keeps the session connection opened but does not communicate any traffic data over it. Notably, the session connection in the idle queue is not closed by the traffic emulator.

In step 308, at least one of the opened session connections not being used to receive data from the DUT is utilized in order to resume the communication of data with the DUT. In some embodiments, an unused session connection in the idle queue may be transferred to the active queue to replace the consumed session connection described in step 306. While the disclosed subject matter is able to replace session connections that are moved to the idle queue from the active queue on a one-to-one basis, some embodiments may utilize a threshold value prior to transferring "replacement" session connections from the idle queue to the active queue. For example, the control module and/or the management application in the traffic emulator may detect/determine that the number of session connections included in the active queue has fallen below a particular predefined number or threshold (e.g., 8000 or 80% of initial number of session connections). Upon such a detection, one or more session connections may be transferred from the idle queue to the active queue. In some embodiments, the control module may utilize any methodology (e.g., a "first in, first out" methodology) to select the session connections to be transferred from the idle queue to the active queue. In some embodiments, the control module and/or the management applications may transfer any number of session connections (i.e., session connection identifiers) from the idle queue to the active queue (e.g., 1, 10, 500, 2000, etc.).

It will also be appreciated that exemplary method 300 is for illustrative purposes and that different and/or additional actions may be used. It will also be appreciated that various actions described herein may occur in a different order or sequence.

Figure 4:
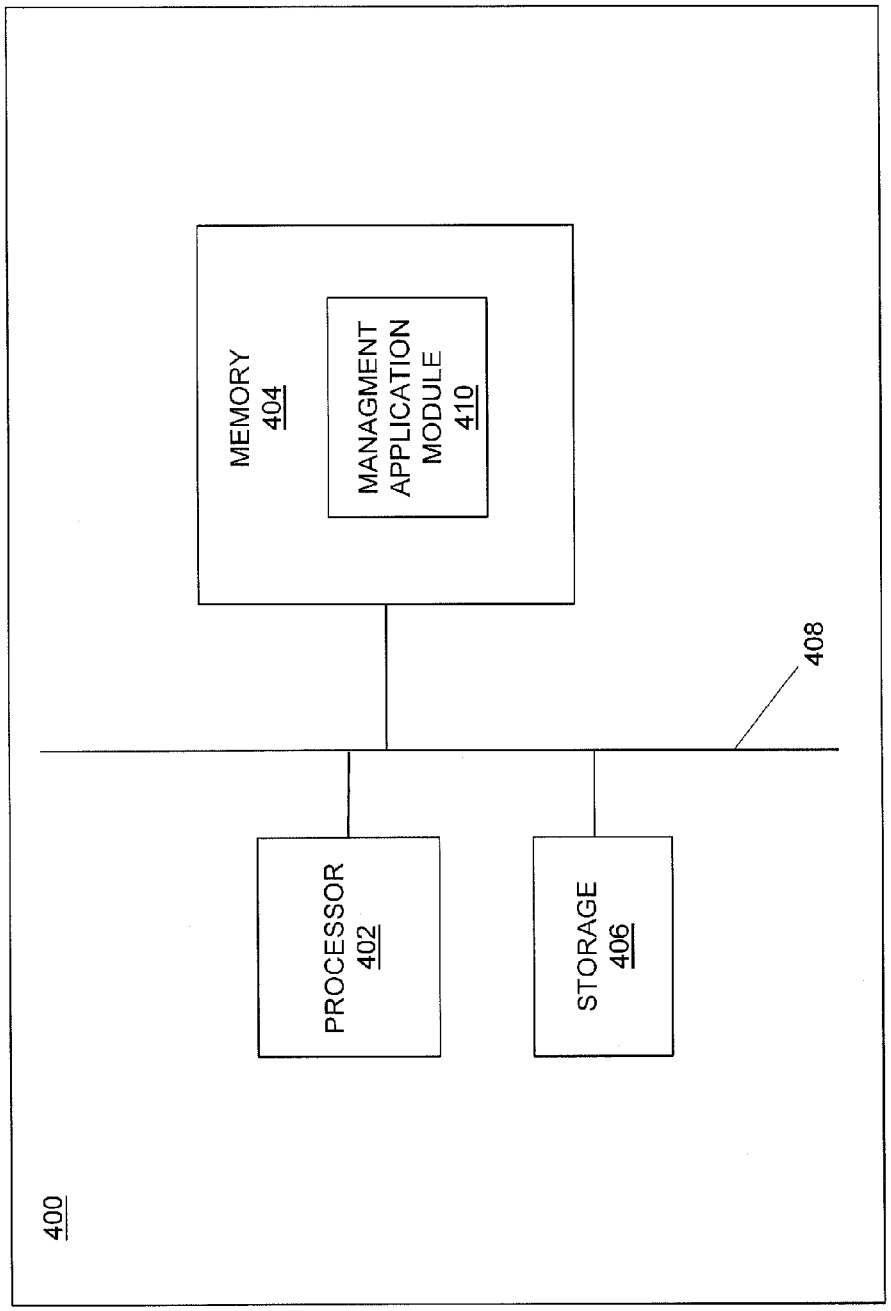
FIG. 4 is a block diagram of a general purpose computer system suitable for use in performing the functions described herein.

FIG. 4 depicts a high level block diagram of a general purpose computer system suitable for use in performing the functions described herein. As depicted in FIG. 4, system 400 comprises a processor 402, a memory 404, a storage device 406, and communicatively connected via a system bus 408. In some embodiments, processor 402 can comprise can comprise a microprocessor, central processing unit (CPU), or any other like hardware based processing unit. In some embodiments, a management application module 410 can be stored in memory 404, which can comprise random access memory (RAM), read only memory (ROM), optical read/write memory, cache memory, magnetic read/write memory, flash memory, or any other non-transitory computer readable medium. In some embodiments, processor 402 and memory 404 can be used to execute and manage the operation of management application module 410. In some embodiments, storage device 406 can comprise any storage medium or storage unit that is configured to store data accessible by processor 402 via system bus 408. Exemplary storage devices can comprise one or more local databases hosted by system 400.

It will be understood that various details of the subject matter described herein may be changed without departing from the scope of the subject matter described herein. Furthermore, the foregoing description is for the purpose of illustration only, and not for the purpose of limitation, as the subject matter described herein is defined by the claims as set forth hereinafter.

What is claimed is:

1. A method for sustaining active control over concurrent session connections, the method comprising:
   in a test simulation system including a traffic emulation device that is communicatively connected to a device under test (DUT):
       opening, by the traffic emulation device, a plurality of session connections to the DUT, wherein each of the opened session connections is associated with an initial window size value;
       receiving, by the traffic emulation device, data from the DUT via one or more of the opened session connections, wherein for each of the one or more of the opened session connections, the traffic emulation device is configured to gradually reduce the initial window size value by an amount data received from the DUT via the opened session connection;
       for each of the one or more opened session connections, communicating from the traffic emulation device a packet instructing the DUT to cease sending the data via the opened session connection in the event the data received from the DUT equals the initial window size value; and
       utilizing, by the traffic emulation device, at least one of the opened session connections not being used to receive the data from the DUT in order to resume active communication of the data with the DUT.

2. The method of claim 1 wherein the plurality of session connections includes a plurality of transmission connection protocol (TCP) connections.

3. The method of claim 1 wherein communicating a packet to instruct the DUT to cease sending packets includes sending a packet that advertises a zero window size.

4. The method of claim 1 comprising establishing an idle queue and an active queue, wherein all of the opened session connections are initially contained in the idle queue.

5. The method of claim 4 wherein utilizing at least one of the opened session connections includes transferring the at least one of the opened session connections not being used to receive the data from the idle queue to the active queue.

6. The method of claim 5 wherein transferring the at least one of the opened session connections not being used to receive the data from the idle queue to the active queue is performed after a predetermined threshold number of session connections is transferred from the active queue to the idle queue.

7. The method of claim 1 wherein the device under test includes at least one of a serving gateway (SGW) element, a packet data network gateway (PGW) element, a firewall element, a server load balancer element, and a deep packet inspection (DPI) device.

8. A system for sustaining active control over concurrent session connections, the system comprising:
a traffic emulation device that is configured to be communicatively connected to a device under test (DUT) in a test simulation system, the traffic emulation device including:
a control module configured, when executed by a processor in the traffic emulation device, to open a plurality of session connections to the DUT, wherein each of the opened session connections is associated with an initial window size value; and
an application configured to receive data from the DUT via one or more of the opened session connections, for each of the one or more opened session connections, to communicate a packet instructing the DUT to cease sending the data via the opened session connection in the event the data received from the DUT equals the initial window size value, and to utilize at least one of the opened session connections not being used to receive the data from the DUT in order to resume active communication of the data with the DUT, wherein for each of the one or more of the opened session connections, the application is configured to gradually reduce the initial window size value by an amount of data received from the DUT via the opened session connection.

9. The system of claim 8 wherein the plurality of session connections includes a plurality of transmission connection protocol (TCP) connections.

10. The system of claim 8 wherein the application is further configured to send a packet that advertises a zero window size.

11. The system of claim 8 wherein the application is further configured to establish an idle queue and an active queue, wherein all of the opened session connections are initially contained in the idle queue.

12. The system of claim 11 wherein the application is further configured to transfer the at least one of the opened session connections not being used to receive the data from the idle queue to the active queue.

13. The system of claim 12 wherein the application is further configured to transfer the at least one of the opened session connections not being used to receive the data from the idle queue to the active queue after a predetermined threshold number of session connections is transferred from the active queue to the idle queue.

14. The system of claim 8 wherein the device under test includes at least one of a serving gateway (SGW) element, a packet data network gateway (PGW) element, a firewall element, a server load balancer element, and a deep packet inspection (DPI) device.

15. A non-transitory computer readable medium having stored thereon executable instructions that when executed by the processor of a computer control the computer to perform steps comprising:
in a test simulation system including a traffic emulation device that is communicatively connected to a device under test (DUT):
opening, by the traffic emulation device, a plurality of session connections to the DUT, wherein each of the opened session connections is associated with an initial window size value;
receiving, by the traffic emulation device, data from the DUT via one or more of the opened session connections, wherein for each of the one or more of the opened session connections, the traffic emulation device is configured to gradually reduce the initial window size value by an amount of data received from the DUT via the opened session connection;
for each of the one or more opened session connections, communicating from the traffic emulation device a packet instructing the DUT to cease sending the data via the opened session connection in the event the data received from the DUT equals the initial window size value; and
utilizing, by the traffic emulation device, at least one of the opened session connections not being used to receive the data from the DUT in order to resume active communication of the data with the DUT.

16. The non-transitory computer readable medium of claim 15 wherein the plurality of session connections includes a plurality of transmission connection protocol (TCP) connections.

17. The non-transitory computer readable medium of claim 15 wherein communicating a packet to instruct the DUT to cease sending packets includes sending a packet that advertises a zero window size.

18. The non-transitory computer readable medium of claim 15 comprising establishing an idle queue and an active queue, wherein all of the opened session connections are initially contained in the idle queue.

19. The non-transitory computer readable medium of claim 18 wherein utilizing at least one of the opened session connections includes transferring the at least one of the opened session connections not being used to receive the data from the idle queue to the active queue.

20. The non-transitory computer readable medium of claim 19 wherein transferring the at least one of the opened session connections not being used to receive the data from the idle queue to the active queue is performed after a predetermined threshold number of session connections is transferred from the active queue to the idle queue.

* * * * *